United States Patent [19]
Someya et al.

[11] Patent Number: 5,187,125
[45] Date of Patent: Feb. 16, 1993

[54] SINTERED BODY OF CALCIUM CARBONATE AND PROCESS FOR PRODUCING SAME

[75] Inventors: Nobuo Someya; Tadao Kitazato, both of Tokyo; Takao Fujikawa, Kobe; Yasuo Manabe, Osaka, all of Japan

[73] Assignees: Marine Bio Co. Ltd., Tokyo; Kabushiki Kaisha Kobeseikosho, Kobe, both of Japan

[21] Appl. No.: 766,263

[22] Filed: Sep. 27, 1991

[30] Foreign Application Priority Data

Sep. 28, 1990 [JP] Japan .................. 2-261525
May 10, 1991 [JP] Japan .................. 3-106052

[51] Int. Cl.$^5$ .................. C04B 35/00; C01F 11/18
[52] U.S. Cl. .................. 501/1; 106/35; 264/60; 264/65; 623/16; 423/430
[58] Field of Search .................. 423/430; 501/123, 1; 106/464, 35; 623/16; 264/56, 60, 65

[56] References Cited

U.S. PATENT DOCUMENTS 1,269,331 6/1918 Spencer .................. 501/123
3,966,884 6/1976 Jacob .................. 501/123
4,149,893 4/1979 Aoki et al. .................. 501/123

FOREIGN PATENT DOCUMENTS 520829 5/1940 United Kingdom .................. 501/123

*Primary Examiner*—Michael Lewis
*Assistant Examiner*—Stephen G. Kalinchak
*Attorney, Agent, or Firm*—Oblon, Spivak, McClelland, Maier & Neustadt

[57] ABSTRACT

The invention relates to a process for producing a sintered body of calcium carbonate without permitting thermal decomposition of calcium carbonate during sintering, and to the sintered body. A powder material primarily comprising calcium carbonate is subjected to a cold powder pressing process to prepare a green compact, which is then heated in a high-pressure gas atmosphere consisting essentially of an inert gas at a temperature t° C. of $$900 \leq t < 1200$$

and at a high gas pressure P kgf/cm$^2$ of $$P > \frac{(t - 600)^{3.5}}{4.7 \times 10^8}$$

7 Claims, 3 Drawing Sheets

SINTERED BODY OF CALCIUM CARBONATE AND PROCESS FOR PRODUCING SAME

FIELD OF THE INVENTION AND RELATED ART STATEMNET

The present invention relates to a process for preparing a sintered body of calcium carbonate by sintering a powder material consisting primarily of calcium carbonate which is present chiefly naturally, and to the sintered body of calcium carbonate prepared by the process.

Calcium carbonate is a very light substance which is 2.7 in specific gravity. Minerals consisting mainly of this substance and having a high density are naturally occurring limestone and marble which are widely used as building materials. Coral sand also consists mainly of calcium carbonate and is a natural resoruce which is present abundantly in coatal areas having coral reefs and which, however, is not effectively utilized presently.

Calcium is one of the components forming the bones of living bodies. Accordingly, research is under way on the use of the above-mentioned various calcium carbonate materials for artificial teeth, artificial bones and the like and on the use of such materials for substitutes for ornamental goods, etc. which have heretofore been produced from animal bones and fangs.

While calcium carbonate naturally occurs in the form of calcite, limestone, marble, shells, corals (coral sand), etc., this compound thermally decomposes as represented by the following formula when heated.
$CaCO_3 \rightarrow CaO + CO_2$ The $CO_2$ resulting from this thermal decomposition has a partial pressure of as high as 760 mm Hg (atmospheric pressure) at about 900° C., so that even if sintered under normal atmospheric pressure, the carbonate undergoes a rapid thermal decomposition and therefore fails to form any sintered body. For this reason, no material or part of specified shape has been produced by molding a powder of calcium carbonate and sintering the molding at a high density.

OBJECTS AND SUMMARY OF THE INVENTION

The first object of the present invention, which has been accomplished in view of the above problem, is to provide a process for producing a sintered body of calcium carbonate without causing thermal decomposition and to provide the sintered body. The second object of the invention is to effectively utilize coral sand which is abundantly present naturally.

The process of the present invention for producing a sintered body of calcium carbonate is characterized by subjecting a powder material primarily comprising calcium carbonate to a cold powder pressing process to prepare a green compact, and heating the compact in a high-pressure gas atmosphere consisting essentially of an inert gas at a temperature t° C. of $900 \leq t < 1200$ and at a high gas pressure P kgf/cm² of $$P > \frac{(t - 600)^{3.5}}{4.7 \times 10^8}$$

In this process, the green compact can be heated at a low pressure first to obtain a porous sintered body having closed pores, and further heating the porous sintered body at a high pressure, whereby a compacted sintered body can be obtained easily.

In the case where the powder material primarily comprising calcium carbonate is coral sand according to the invention, the coral sand is desalted and then pulverized to a powder smaller than 200 μm in particle size. The powder material thus treated is compressed cold under a pressure of at least 500 kgf/cm² to prepare a green compact, and the compact is heated, as embedded in a powder containing calcium carbonate, in an inert gas atmosphere of the specified high pressure at a temperature of 900° to 1200° C. to obtain a compacted sintered body containing at least 80% of calcium carbonate and having a relative density of at least 80%.

The heating temperature t° C. is in the range of $900 \leq t < 1200$ because if the temperature is less than 900° C., it is impossible to obtain a sintered body having a substantially satisfactory strength and further because if it is not lower than 1200° C., calcium carbonate melts.

The high gas pressure P kgf/cm² for heating is

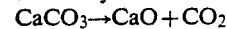

since the green compact can be sintered without thermally decomposing calcium carbonate when P is in this range.

FIG. 1 is a graph showing the relationship between the temperature of thermal decomposition of calcium carbonate and the equilibrium partial pressure of $CO_2$ involved in the decomposition. The range defined by the above expression corresponds to the stable region of $CaCO_3$ in FIG. 1.

The thermal decomposition formula of calcium carbonate and FIG. 1 appear to indicate that the sintering of calcium carbonate to be effected with inhibited thermal decomposition thereof requires heating in an inert gas atmosphere capable of giving a suitable $CO_2$ partial pressure, whereas with the present invention, it is not necessary to intentionally give a $CO_2$ partial pressure as a high gas pressure, but a desired inert gas is usable for calcium carbonate. This appears attributable to the following specificity of calcium carbonate.

With reference to FIG. 2, only the surfaces of calcium carbonate forming the green compact thermally decompose during a rise of temperature and become covered with a thin layer of calcium oxide (CaO), and the gas pressure represented by the above expression and acting on the particle surfaces during the subsequent rise of temperature presumably inhibits the thermal decomposition of calcium carbonate in the interior. Rapid thermal decomposition is inhibited at this time presumably also by slow diffusion of C or $CO_3$ ions, i.e., by the phenomenon that $CO_3$ ions are unable to smoothly migrate from the interior to the surface.

Incidentally, it is known that ceramics with which thermal decomposition becomes a problem, for example, silicon nitride can be effectively sintered under a high nitrogen partial pressure, and this method is already in industrial use. In the case of silicon nitride, it is also known that replacement of nitrogen by argon is totally ineffective. Thus, it is well known that the partial pressure of a gas component resulting from decomposition is of importance.

To obtain a compact sintered body, it is desired to heat the green compact first at a low pressure and thereafter at a high pressure. When a porous sintered body having closed pores is obtained by the low-pressure heating, the internal pressure of the pores is low, with the result that the pores are compressed easily during the subsequent high-pressure heating, readily providing a compacted sintered body. The pressure $P_1$ kgf/cm² for the first-step heating is approximately in the range of $A < P_1 \leq P_1 + 30$ (wherein $A = (t - 600)^{3.5}/4.7 \times 10^6$), and the pressure $P_2$ kgf/cm² for the second-step heating is $500 \leq P_2$, whereby a sintered body can be obtained with ease which is at least 95% in relative density.

As described above according to the process of the invention for producing a sintered body of calcium carbonate, a powder material primarily comprising calcium carbonate is compressed into a green compact, which is then heated in an inert gas atmosphere at predetermined temperature and pressure. The process therefore makes it possible to sinter calcium carbonate which has conventionally been considered difficult to sinter. When the green compact is heated in two steps, a compacted sintered body can be obtained easily. Especially when prepared from coral sand chiefly comprising calcium carbonate according to the invention, the sintered body has a small density of 2.15 to 2.70 g/cm³, is useful as a material for accessories and ornamental goods which were prepared from natural products, for artificial bones and teeth and for building components of high quality, and can be utilized as a structural material since it is lower in specific gravity than other ceramics. Thus, the present sintered body is very valuable for industrial applications. Furthermore, it is expected that the present technique will contribute to effective utilization of oyster shells and other shells which have heretofore been discarded.

DESCRIPTION OF THE PREFERRED EMBODIMENTS

Embodiments of the present invention will be described below with reference to the drawings.

The powder material to be used and primarily comprising calcium carbonate is finely divided limestone or shells, or a material industrially produced by the carbon dioxide reaction process, soluble salt reaction process, or the like. Examples of powder pressing processes are die molding process, slip casting process, cold isostatic pressing process (CIP process), etc. A green compact is prepared by such a process and then heated in a pressurized gas atmosphere consisting essentially of a gas inert to calcium carbonate, such as argon or nitrogen, and inevitably containing impurity gases.

As already described, the gas pressure P kgf/cm² of the atmosphere is set within the range defined by the expression (2) at the heating temperature t° C., and the eventual heating temperature t° C. is set to a level in the range of the expression (1).

$$900 \leq t < 1200 \quad (1)$$

$$P > \frac{(t - 600)^{3.5}}{4.7 \times 10^8} \quad (2)$$

When the green compact is sintered in a gas atmosphere with a rise of temperature, for example, from about 600° C. at a high gas pressure of at least 500 kgf/cm², it is possible to produce a sintered body having open pores and possessing a considerable strength.

Figure 3:
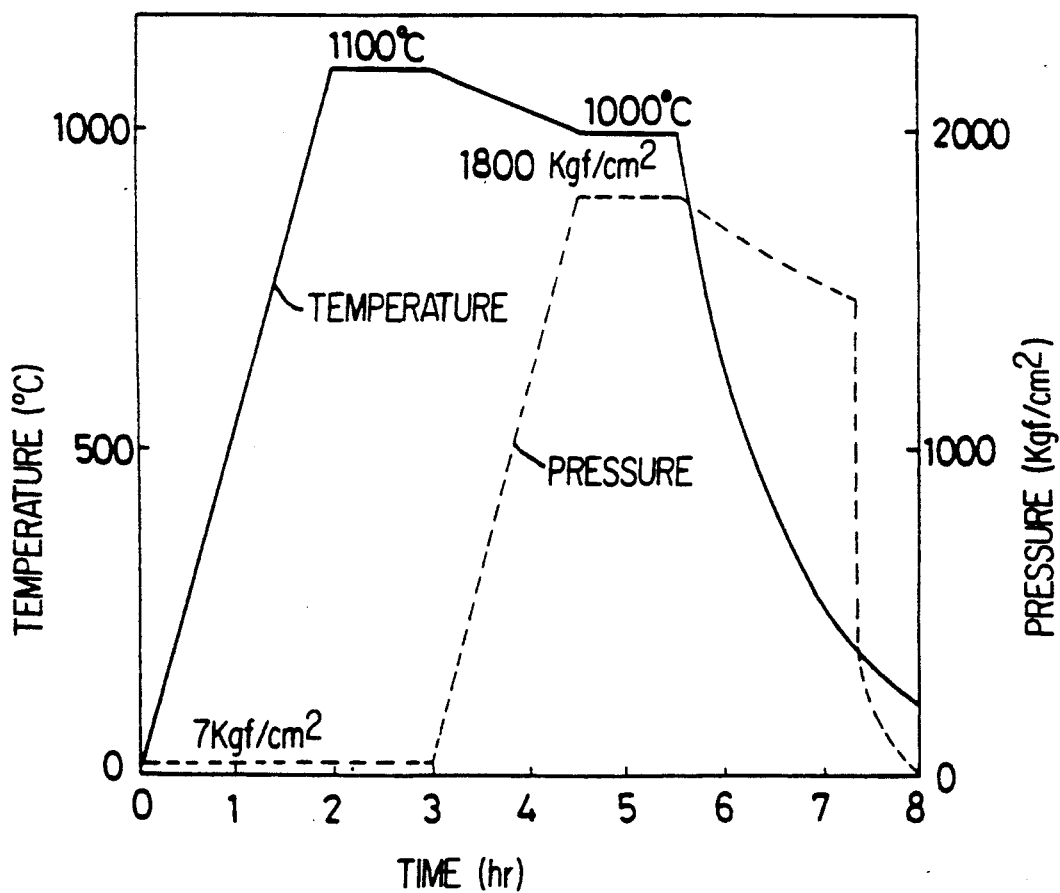
FIG. 3 is a graph showing temperature and pressure patterns for two-step heating.

It is also possible to obtain a compact sintered body slightly having light-transmitting properties and at least 99% in relative density by heating a green compact by two-step heating, i.e., by sintering the compact first at 1100° C. at a pressure close to the limit of the foregoing expression, e.g., at 7 kgf/cm² to prepare a sintered body having closed pores (at least 93% in relative density), and heating the closed-pore body at a pressure of 1000 kgf/cm². FIG. 3 shows exemplary temperature and pressure patterns in the case where this process is practiced in one furnace.

Next, a specific example will be described in which the material primarily comprising calcium carbonate is coral sand.

The coral sand collected from the bottom of the sea contains salt and the like which are components of seawater, microorganisms and dust, so that they need to be removed. The coral sand as collected is usually up to 2 mm in particle size, and is washed with water as it is, whereby the salt is removed almost completely. Depending on the kind of corals, sand particles are also likely to internally contain a considerable amount of salt. In such a case, it is desirable to pulverize the sand first as will be described below and thereafter wash the sand.

The coral sand thus cleaned for the removal of salt, etc. is pulverized so as to be formed to shape easily in the subsequent step. The sand is pulverized by means usually used, such as ball mill, vibrating mill or roller mill. From the viewpoint of ease of forming, it is desirable to pulverize the sand to particles sizes of up to 200 μm.

When it is desired to obtain a sintered product of specified color, an inorganic pigment is mixed with the sand in the pulverizing step or with the material powder as roughly pulverized.

The powder obtained and up to 200 μm in particle size is formed cold into a green compact in conformity with the shape of the product to be obtained. The forming method is suitably selected in accordance with the shape and size of the product. Depending on the forming method, an organic binder is admixed with the powder to make the powder easily formable and impart an improved strength to the green compact to be obtained. In this case, the compact is treated at a temperature of up to about 450° C. for the removal of the binder. If heated at a temperature of higher than 500° C. under atmospheric pressure, the compact will develop troubles in giving the desired product since the main component, calcium carbonate, then starts to thermally decompose. When the product to be prepared is in the form of a plate, die molding is generally resorted to. It is desirable that the molding pressure be at least 500 kgf/cm² in view of ease of handling of the green compact and in giving strength to the compact when it is to be machined. Further when a cylindrical product is to be obtained, the CIP process or extrusion is suitable. The pressure to be applied is preferably at least 500 kgf/cm$^2$ as in the case of die molding.

The sintering step is most specifically characteristic of the production process wherein the present material is used. As previously stated, the material undergoes thermal decomposition when heated under atmospheric pressure, permitting conversion of calcium carbonate to calcium oxide and failing to afford a sintered body consisting chiefly of calcium carbonate. It is required that the material be sintered with the thermal decomposition inhibited, whereas the literature heretofore available mentions nothing whatever about an attempt to sinter coral sand or a simpler material, calcium carbonate, to a relative density of at least 80%.

Figure 1:
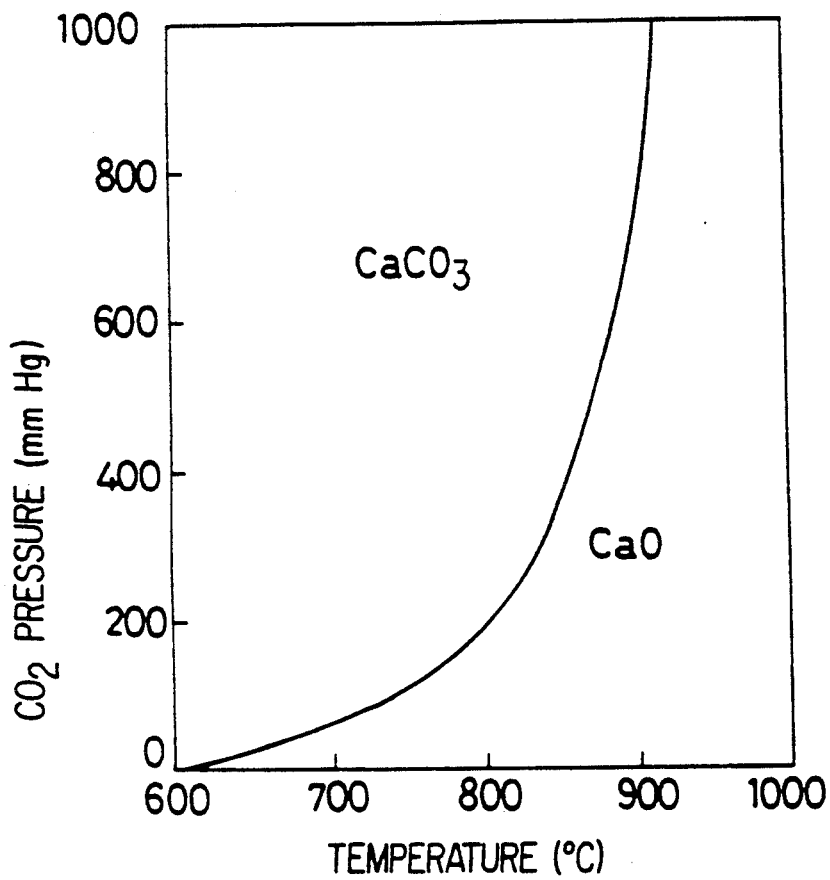
FIG. 1 is a graph showing the relationship between the temperature of thermal decomposition of calcium carbonate and the $CO_2$ pressure involved in the decomposition.

The formula $CaCO_3 \rightarrow CaO + CO_2$ apparently indicates that the partial pressure of $CO_2$, if increased, inhibits this decomposition. However, depending on the kind of ambient atmosphere, $CO_2$ readily decomposes into CO and O at a high temperature as is already known. When CO is present in a large quantity, the drop in the temperature permits the CO to partially convert to $CO_2$ again, forming carbon (C) at the same time. As to the decomposition reaction represented by the foregoing formula, the reaction occurs in the temperature range of up to about 900° C. as shown in FIG. 1, and data as to the temperature and CO partial pressure is known. However, the results of our experiments have revealed that sintering of coral sand to a density of at least 80% requires a temperature of at least 900° C. At a high temperature of about 1000° C., the above decomposition reaction occurs to give CO, and the attendant drop in the temperature causes carbon to separate out, consequently coloring the sintered body black. Accordingly, the ambient atmosphere requires very delicate control. We have further found by experiments that even if the thermal decomposition of calcium carbonate is inhibited, coral sand or calcium carbonate is very soft at a temperature of as high as 1000° C. and therefore deforms irregularly even under gravity.

Based on the foregoing findings as to the specificity of the present material, we have selected such temperature and pressure values, ambient atmosphere for the material to be treated and arrangement that satisfy the expressions (1) and (2) so as to obtain a sintered body at least 80% in relative density and at least 80% in calcium carbonate content. The powder material which is coral sand is difficult to sinter to a relative density of at least 80% at a temperature lower than 900° C. if the material is reduced to small particle sizes, whereas at a temperature higher than 1200° C., calcium carbonate will melt although this is dependent on the pressure.

Figure 4:
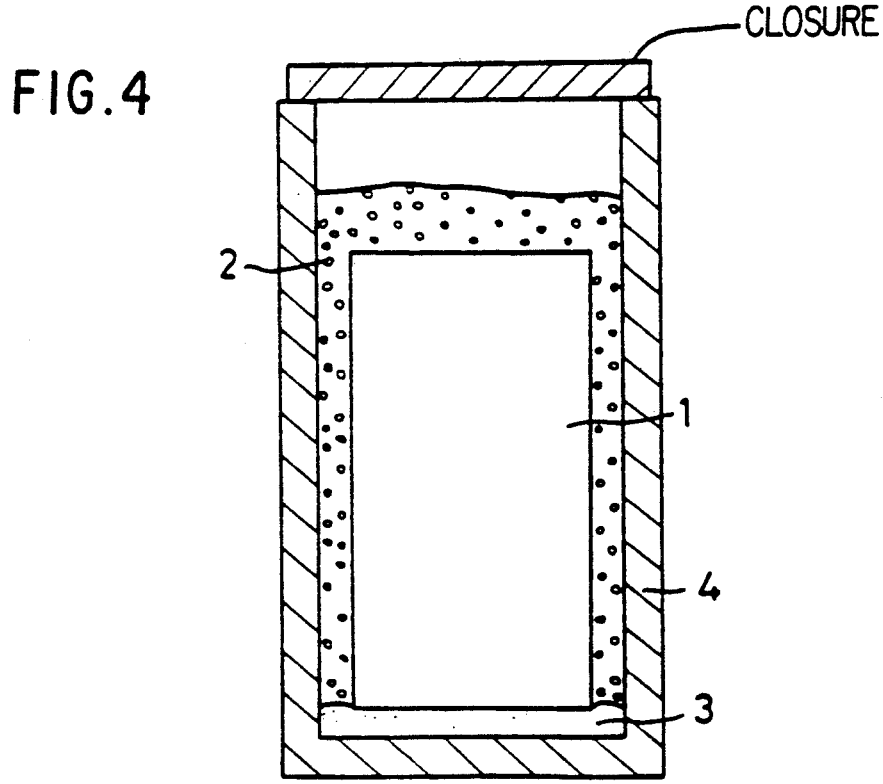
FIG. 4 is a diagram showing sintering means.
Figure 2:
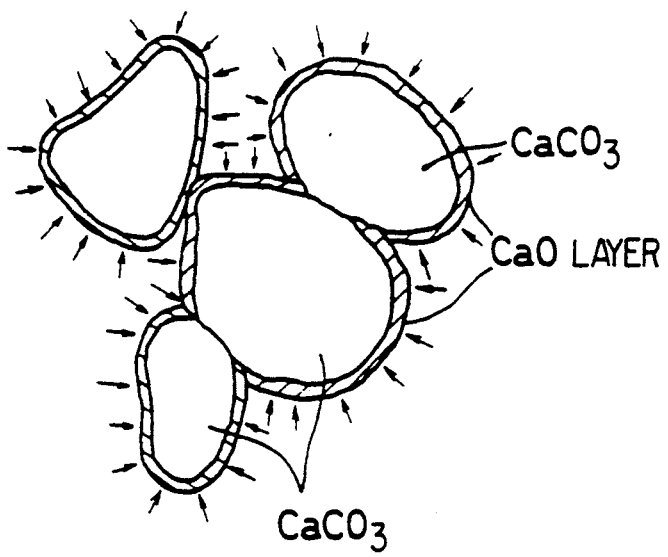
FIG. 2 is a diagram showing $CaCO_3$ particles during heating.

When the material is sintered under a pressure defined by the expression (2), the particles of coral sand are thermally decomposed over the surface and become covered with calcium oxide, whereas the pressure acting on the film of calcium oxide from outside inhibits the decomposition reaction of the interior of the particles. However, if the material is merely thus treated, the thermal decomposition of the surfaces of coral sand particles inevitably occurs, and this tendency becomes more pronounced with a decrease in the particle size. This can be advantageously precluded by treating the material as embedded in a powder containing calcium carbonate. For example, FIG. 4 shows a useful method wherein the material 1 to be treated is placed in a container 4 made of a material not reactive with $CO_2$, with coarse particles of alumina 2 placed in the container around the material 1 and with calcium carbonate or coral sand 3 placed over the bottom of the container or over the material 1. The powder thus packed also serves to prevent the material to be treated from deforming irregularly.

When a considerably fine powder material, for example through 400 mesh in particle size, is sintered at a temperature not lower than 1100° C., a sintered body having closed pores (at least 95% in relative density) is obtained. If the sintered body is sintered, for example, under the conditions of 1000° C. and 1000 kgf/cm$^2$ further continuously or again, a more compacted sintered body can be prepared.

Table 1 shows the composition of an example of coral sand as analyzed. The coral sand was used as a material in the following examples.

TABLE 1

| Component | Content (wt. %) |
|---|---|
| $Fe_2O_3$ | 0.06 |
| $SiO_2$ | 0.18 |
| $Al_2O_3$ | 0.10 |
| $CaCO_3$ | 89.3 |
| $MgCO_3$ | 6.40 |
| MnO | <0.01 |
| $P_2O_5$ | 0.07 |
| $Na_2O$ | 0.40 |
| $K_2O$ | 0.01 |
| $Cr_2O_3$ | <0.01 |
| Organic substances and others | 3.46 |

Table 2 given below shows examples of the invention and comparative examples for comparison.

TABLE 2

| | Material powder | | Forming pressure (kgf/cm$^2$) | Sintering conditions | | | | Sintered body | |
|---|---|---|---|---|---|---|---|---|---|
| | Composition | Particle size (μm) | | Temp. (°C.) | Pressure (kgf/cm$^2$) | Time (hr) | Atmosphere | Relative density (%) | $CaCo_3$ content (%) |
| Ex. | | | | | | | | | |
| 1 | Coral sand 100% | 44 | 500 | 950 | 20 | 1 | Ar | 80 | >95 |
| 2 | Coral sand 100% | 1 | 500 | 1000 | 2000 | 1 | Ar | 90 | 100 |
| 3 | Coral sand 100% | 200 | 2000 | 1000 / 1100 | 1000 / 100 | 1 | $N_2$ | 83 | 100 |
| 4 | Coral sand 100% | 40 | 1000 | 1000 | 1000 | 1 | Ar | >99.5 | 100 |
| 5 | Coral sand 99% Chromium 1% | 44 | 1000 | 1050 | 5 | 1 | Ar | 85 | 82 |
| Comp. Ex. | | | | | | | | | |
| 1 | Coral sand 100% | 44 | 500 | 950 | 1 | 1 | Air | — Many cracks | 0 |
| 2 | Coral sand 100% | 300 | 400 | 950 | 20 | 1 | Ar | 75 (with cracks) | ~90 |
| 3 | Coral sand 100% | 44 | 1000 | 850 | 20 | 1 | Ar | 73 | ~100 |
| 4 | Coral sand 100% | 44 | 500 | 1250 | 2000 | 1 | Ar | Melted | ~65 |

TABLE 2-continued

| | Material powder | | Forming | Sintering conditions | | | | Sintered body | |
|---|---|---|---|---|---|---|---|---|---|
| | Composition | Particle size (μm) | pressure (kgf/cm²) | Temp. (°C.) | Pressure (kgf/cm²) | Time (hr) | Atmosphere | Relative density (%) | CaCo₃ content (%) |
| 5 | Coral sand 100% | 44 | 500 | 950 | 20 | 0.2 | Ar | — Markedly deformed | ~10 |

Note: In each of Examples and Comparative Examples, the powder material was treated as enclosed with packed powder.

The material was treated by the following procedure, for example, in Example 1.

Figure 5:
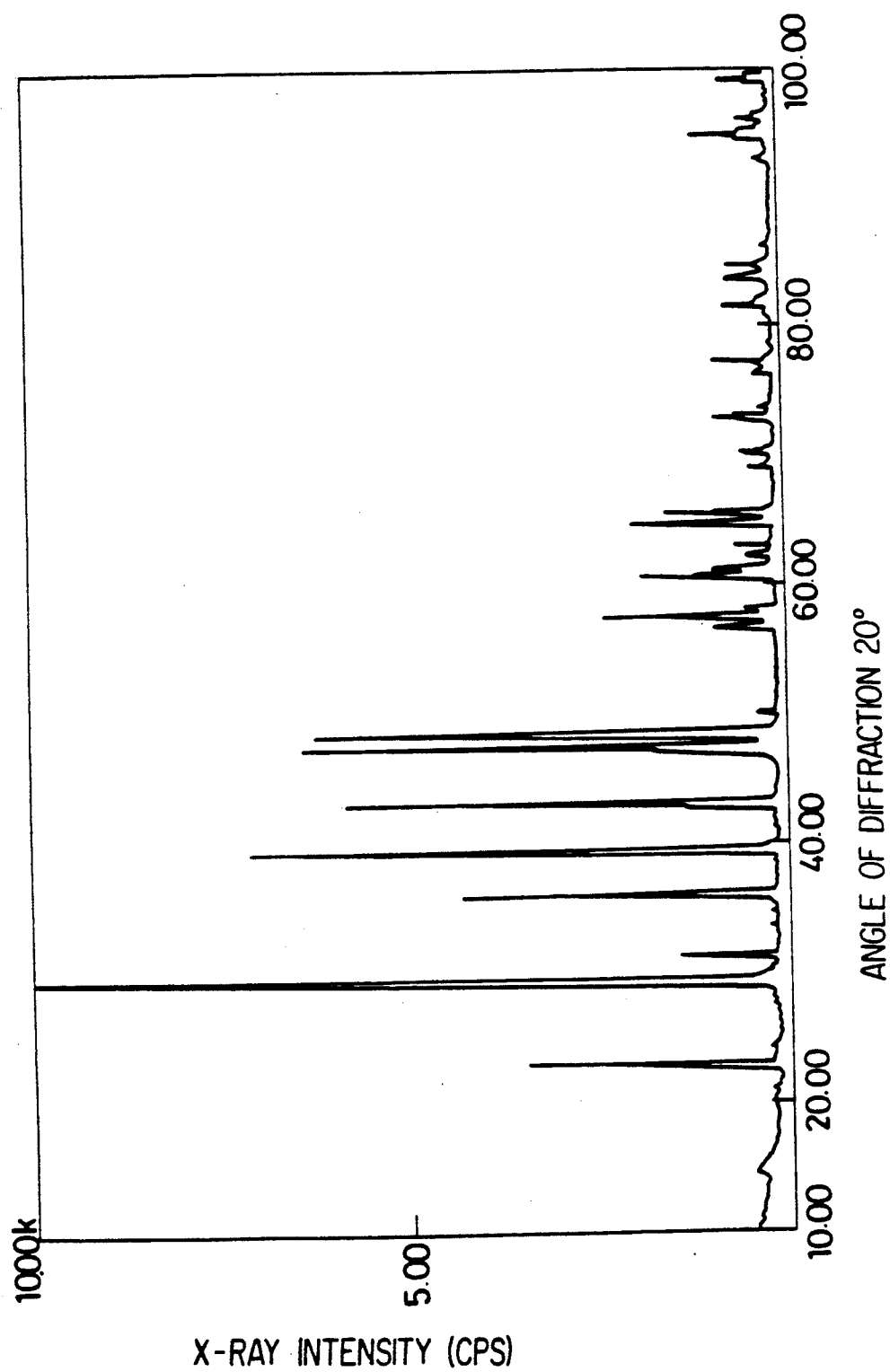
FIG. 5 is a graph showing an X-ray diffraction pattern of a sintered body obtained.

The coral sand having the composition listed in Table 1 was pulverized in a ball mill and thereafter screened for classification to obtain a minus 325-mesh powder (smaller than 44 μm in maximum particle size). The powder was molded with a die under a pressure of 500 kgf/cm² to prepare a green compact about 65% in relative density. The green compact was placed into an alumina container with calcium carbonate powder placed over its bottom to a thickness of several millimeters, and covered with alumina powder. With an alumina closure placed over the top of the container, the container was set in a hot isostatic press. At room temperature, the interior of the press was evacuated, then replaced with argon gas twice at about 10 kgf/cm² and thereafter filled with argon gas to a pressure of about 20 kgf/cm², followed by heating. The green compact was maintained at 950° C. and 20 kfg/cm² for 1 hour, thereafter cooled and withdrawn. The sintered body thus obtained had a density of 2.18 g/cm³ which was over about 80% calculated as relative density. FIG. 5 shows an X-ray diffraction pattern of the sintered body. The pattern indicates that the body consists almost entirely of a calcium carbonate (calcite) phase, hence greatly diminished conversion to calcium oxide.

Table 2 shows that a compact sintered body, at least 80% in relative density, was obtained in any of Examples of the invention free of the thermal decomposition of CaCO₃. Especially, Example 4 wherein the green compact was sintered in two steps gave a sintered body of substantially true density. In contrast, Comparative Example 1 wherein the compact was sintered in air permitted thermal decomposition of CaCO₃, failed to produce a sintered body in shape and afforded cracked fragments. Comparative Example 2 wherein the particle size was outside the range specified by the invention and the forming pressure was lower than the specified range gave an undesirable product which was locally cracked. In Comparative Example 3 wherein the heating temperature was lower than is specified by the invention, the heating pressure was 20 kgf/cm², but no thermal decomposition of CaCO₃ occurred, whereas the sintered body was low in strength and difficult to handle. In Comparative Example 4 wherein the heating temperature was higher than is specified by the invention, a melted product was obtained, while Comparative Example 5 wherein the sintering time was short produced a markedly deformed sintered body, which was a reject.

What is claimed is:

1. A process for producing a sintered body of calcium carbonate which comprises subjecting a powder material primarily comprising calcium carbonate to a cold powder pressing process to prepare a green compact, and heating the compact in a high-pressure gas atmosphere consisting essentially of an inert gas and an effective amount of carbon dioxide at a temperature t° in centigrade of $$900 \leq t < 1200$$

and at a high gas pressure P in kgf/cm² of $$P > \frac{(t - 600)^{3.5}}{4.7 \times 10^8}$$

2. A process as defined in claim 1 wherein the green compact is heated at a first pressure to obtain a porous sintered body having closed pores and further heating the porous sintered body at a second higher pressure to compact the porous sintered body.

3. A process as defined in claim 1 or 2 wherein the powder material is coral sand.

4. A process as defined in claim 3 wherein the powder material is desalted and thereafter pulverized to not greater than 200 μm in particle size.

5. A process as defined in claim 4 wherein the powder material is compressed cold at a pressure of at least 500 kgf/cm².

6. A process as defined in claim 5 wherein the green compact is heated as embedded in a powder containing calcium carbonate.

7. A sintered body of calcium carbonate particles with a calcium oxide coating prepared from a material primarily comprising coral sand, the sintered body being at least 80% in calcium carbonate content and at least 80% in relative density.

* * * * *